United States Patent [19]

Meiller et al.

[11] Patent Number: 4,544,598

[45] Date of Patent: Oct. 1, 1985

[54] SEAT CUSHION WITH A TEXTILE COVER

[75] Inventors: Hermann Meiller; Helmut Storch, both of Amberg, Fed. Rep. of Germany

[73] Assignee: Willibald Grammer, Fed. Rep. of Germany

[21] Appl. No.: 522,633

[22] Filed: Aug. 11, 1983

[30] Foreign Application Priority Data

Aug. 14, 1982 [DE] Fed. Rep. of Germany ....... 3230321

[51] Int. Cl.$^4$ ............................ B32B 5/32; B32B 7/04
[52] U.S. Cl. .................................. 428/246; 428/309.9; 428/310.5; 428/316.6; 428/318.6; 428/318.8
[58] Field of Search ............... 428/310.5, 314.4, 314.8, 428/316.6, 318.6, 318.8, 306.6, 308.4, 309.9, 246

[56] References Cited

U.S. PATENT DOCUMENTS

| 3,118,153 | 1/1964 | Hood | 428/316.6 |
| 3,922,429 | 11/1975 | Welch | 428/316.6 |
| 4,350,734 | 9/1982 | Hammond | 428/316.6 |

FOREIGN PATENT DOCUMENTS 1415852 11/1975 United Kingdom ............. 428/314.4

Primary Examiner—William J. Van Balen
Attorney, Agent, or Firm—Louis E. Marn

[57] ABSTRACT

In a seat cushion with a textile cover, a lined foam layer on the textile cover and a cold foam core, a skin is formed on the lined foam at the side adjacent the cold foam core which prevents a penetration of the cold foam into the lined foam.

1 Claim, 1 Drawing Figure

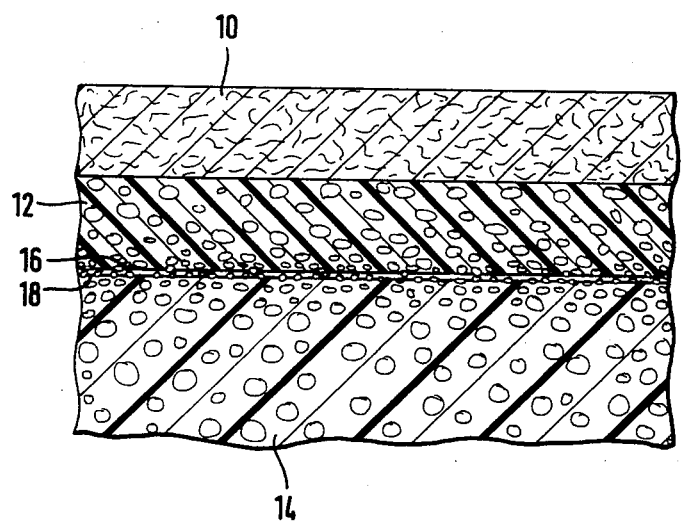

SEAT CUSHION WITH A TEXTILE COVER

The invention relates to a seat cushion with a textile cover, a layer of lined foam applied to the rear side of the textile cover and a core of cold foam. Such cushions of this type are known for a long time. In the known seat cushions of this type, an air permeable foil is applied on the side opposite of the side of the textile cover on which the lined foam is applied which during the foaming of the cold foam prevents a penetration into the lined foam. Such a penetration would result in a hardening of the lined foam layer and would also generate the danger that the cold foam could penetrate into the textile cover. However, the foil is disadvantageous in that it is air impermeable, thus enhancing a perspiring of persons using such a seat cushion. Furthermore, the foil is an additional cost factor.

Seat cushions are also known, wherein the layer of lined foam is missing and wherein the foil is directly applied to the textile cover. However, such seat cushions enhance the perspiring of the persons using the seat cushions even more.

It is therefore an object of the invention to design a seat cushion of the aforementioned type in such a manner that the foil which is disadvantageous in many ways in known seat cushions of this type can be eliminated altogether.

This object of the invention is obtained in that a skin is formed from the lined foam on the side of the lined foam layer disposed opposite to the textile cover which is in direct contact with the cold foam of the cushion core.

For example, the skin formed from the cold foam is obtained by flaming, whereby the upper layer of the laminated foam melts and solidifies and can thereby be completely closed, or may have fine pores. In the latter case, the cold foam partially penetrates through the pores of the skin into the lined foam layer during foaming, but not too intensively during the solidifying process of the cold foam, since this would result in a hardening of the lined foam or even resulting in reaching the textile cover. However, a large part of the skin pores remain open so that an air circulation through the lined foam layer to the cold foam is made possible.

An exemplified embodiment is shown schematically in the attached drawing. The drawing shows a textile cover 10, a lined (laminated) foam layer 12 and a core 14 made of cold foam. The line foam and the cold foam may both be polyurethane foams. The thickness of the lined foam layer 12 may be of the same thickness as the textile cover 10. The layer of lined foam is applied either by bonding or flaming, for example. As can be seen, the hollow spaces in the lined foam 12 are smaller than in the cold foam 14. Also, a skin 16 is formed on the side of the lined foam 12 opposite of textile cover 10, in that, the lined foam is flamed on this side, for exmaple, so that the plastic partially melts and soldifies, whereby the permeability is reduced due to the reducing hollow spaces. This results in a fine porous skin which prevents the penetration of the cold foam 14 into the lined foam 12 during foaming.

In the subject exemplified embodiment, the cold foam 14 is also provided with a skin 18 which is generated during the soldification along the limit layer. This skin is generated in that the expansion of the cold foam is prevented to penetrate through the skin of the lined foam.

We claim:
1. A seat cushion which comprises:
   a layer of a lined from foam having a flamed formed air permeable skin;
   a cushion core cold foam disposed against said skin and formed against said skin of said layer of lined foam during foaming of said cushion core whereby penetration of said cold foam into said lined foam is substantially prevented; and
   a textile cover mounted over said layer of said lined foam.

* * * * *